United States Patent [19]

Laing et al.

[11] Patent Number: 5,520,454
[45] Date of Patent: May 28, 1996

[54] INJECTION SCREW SET FOR AN INJECTION MOLDING MACHINE

[75] Inventors: Muh-Wang Laing, Miao-Li Hsien; Lang-Fu Tsay, Hsinchu, both of Taiwan

[73] Assignee: Industrial Technology Research Institute, Hsinchu Hsien, Taiwan

[21] Appl. No.: 304,016

[22] Filed: Sep. 9, 1994

[51] Int. Cl.⁶ ..................................................... B29B 1/04
[52] U.S. Cl. ............................................. 366/79; 366/90
[58] Field of Search ................................. 366/79, 88, 89, 366/90, 85, 86, 84, 96, 97, 98, 99, 318, 319, 320, 321, 322, 323, 324; 425/207, 208, 209

[56] References Cited

U.S. PATENT DOCUMENTS

| | | | |
|---|---|---|---|
| 2,200,997 | 5/1940 | Royle | 366/90 |
| 4,045,401 | 8/1977 | Stenmark | 366/90 |
| 4,334,785 | 6/1982 | Blach | 366/322 |
| 4,600,311 | 7/1986 | Mourrier | 366/90 |
| 5,304,000 | 4/1994 | Loomans | 366/85 |

Primary Examiner—Robert W. Jenkins
Attorney, Agent, or Firm—W. Wayne Liauh

[57] ABSTRACT

An interchangeable injection screw for use in an injection molding machine is disclosed. It comprises: (a) an interchangeable feeding section, an interchangeable compression-and-melting section, an interchangeable metering-and-mixing section, and an interchangeable screw head, wherein the interchangeable feeding section, the interchangeable compression-and-melting section, the interchangeable metering-and-mixing section and the interchangeable screw head can severed from each other; (b) a splined shalt integrally formed with the interchangeable feeding section and extending in front thereof so as to sleevedly receive, in order from the feeding section, the compression-and-melting section and the interchangeable metering-and-mixing section; and (c) a screw means for affixing the interchangeable screw head to the splined shalt so as to form a complete injection screw. In a preferred embodiment, the splined shalt contains a female screw stub at its front to threadably receive a male screw bolt provided in middle of the internal portion of the interchangeable metering-and-mixing section, so as to provide adjustable length of the injection screw.

4 Claims, 5 Drawing Sheets

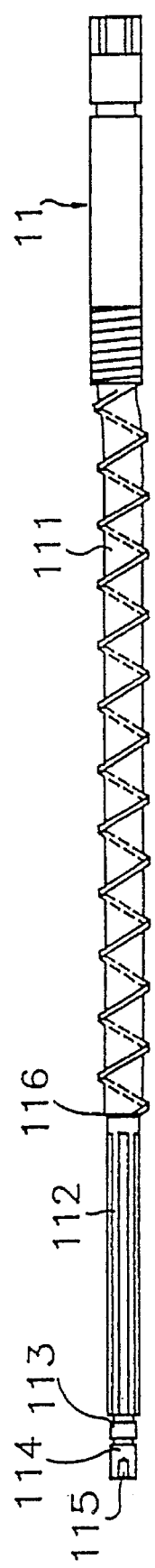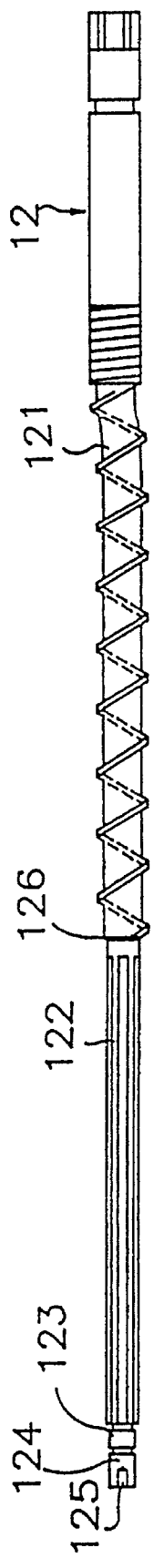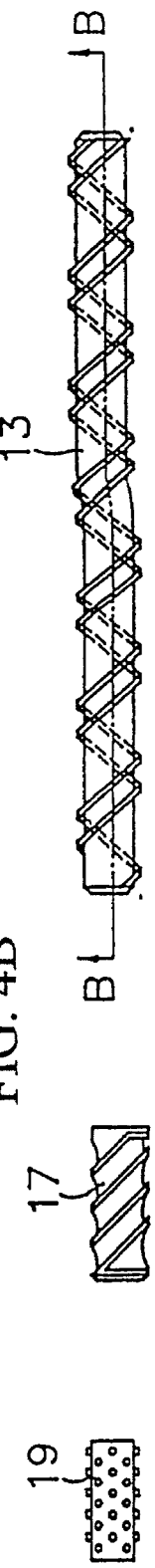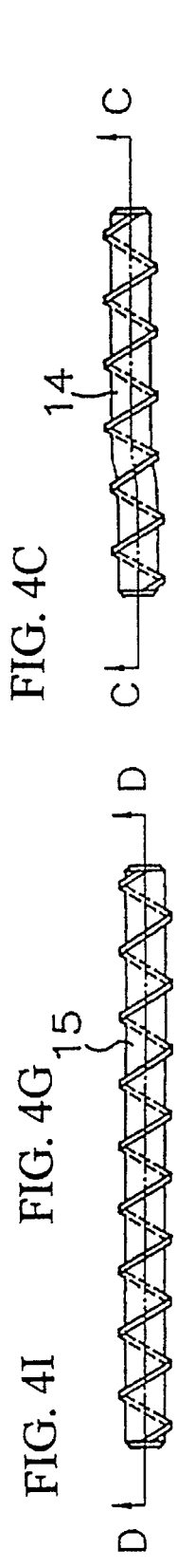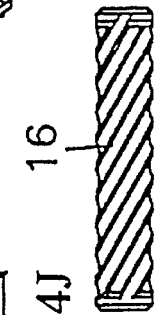

B—B

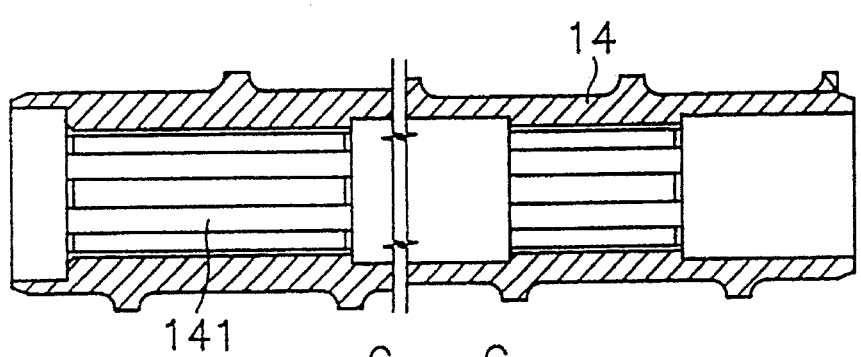
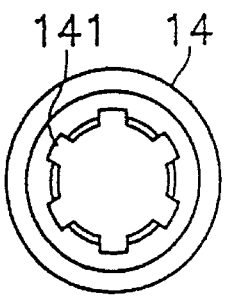
C – C
FIG. 7A
FIG. 7B
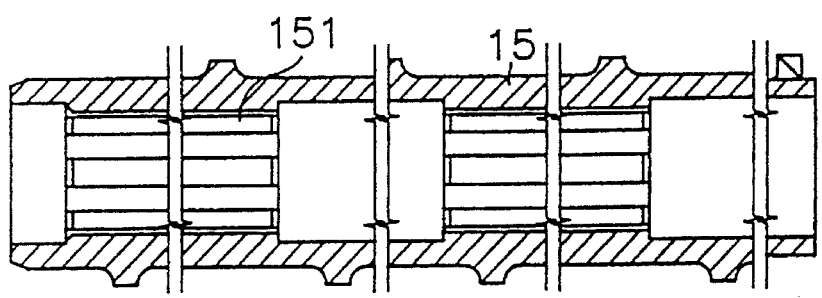
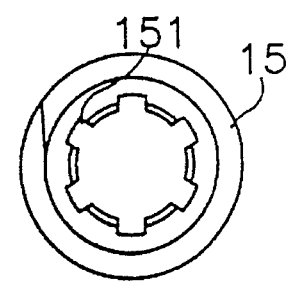
D – D
FIG. 8A
FIG. 8B
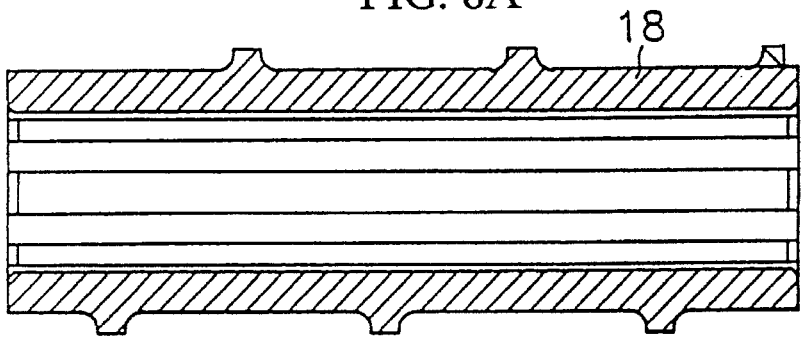
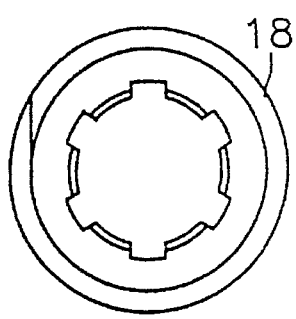
E – E
FIG. 9A
FIG. 9B
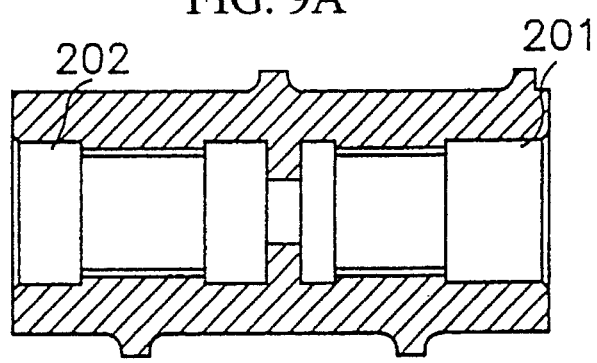
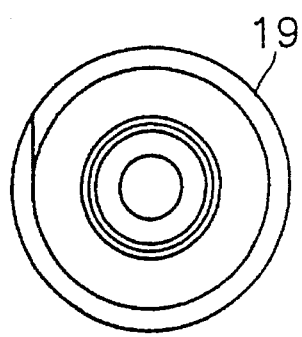
FIG. 10A
FIG. 10B

INJECTION SCREW SET FOR AN INJECTION MOLDING MACHINE

BACKGROUND OF THE INVENTION

A conventional injection molding machine usually comprises a machine base, a clamping unit, an injection unit and an electro-controlled hydraulic system; the present invention is merely related to that injection unit.

The conventional injection process includes the steps as shown in FIGS. 1—1 to 1-4; such steps include damping mold, injection and holding pressure, cooling and metering, and demolding. The plastic material in hopper "A" can automatically fall into a heating barrel "B"; then, the screw "C" turns to mix the material and to convey the material via the screw groove to the front end of the heating cylinder "B". Then the material therein will be melted as result of a heater applying heat to the heating barrel "B" and a shearing heat generated by the rotating screw "C". When as the melted material is conveyed to the front end of the heating cylinder "B", a counter pressure will take place to compel the screw "C" to move back to a given position (i.e., the metering position), and then the screw "C" will stop rotating. Subsequently, the hydraulic cylinder "D" of the injection unit will push the screw "C" to move forward to have screw "C" become an injection plug so as to inject the melted material out of a nozzle "E" at the front end of the heating barrel "B" to inject into a mold "F"; after holding pressure, cooling and demolding, and molding product "G" is rolled off the line. The mold "F" may be dosed again to be ready for the next molding cycle. It is apparent that the injecting screw is the important key part of an injection molding machine. It is closely related to the function of conveying, melting, mixing, and metering the material, and the quality control of an end product.

A current conventional screw is shown in FIG. 2, which may be divided, according to its geometrical shape, into three sections, i.e., (1) a feeding section "L1" in which materials are to be pre-heated and conveyed, (2) a compression section "L2" in which the materials are to be compressed with a shearing force, mixed, and pressurized and air-exhausting, (3) a metering section in which the materials are to be mixed, metered and conveyed in a melted state. In real molding process, the functions of the various sections often overlap each other, as it is rather difficult to divide their functions dearly. The features of the screw are that its screw pitches are equal to each other, and its feeding section "L1" has a fixed depth of thread "hF". The depth of thread "hF" is gradually changed from the depth of thread "hF" to a depth of thread "hM" through the compression section "L2". The metering section "L3" has a fired depth of thread "hm"; the depth of thread "hF" is greater than the depth of thread "hM". Most of the ordinary molding factories use one screw to mold different plastic materials, and that screw may be referred to as "universal" screw. In fact, each kind of plastic material has its particular physical characteristics, which require a screw to be designed with different parameters, such as the compression ratio, the length of the three sections and the geometrical figures thereof. In other words, the aforesaid "universal" screw is unable to provide the best molding result. Some factories have become aware of the necessity of using "individual" screws to improve the quality of products. Therefore, they use different screws, which become problems such as higher production costs and management costs.

Currently, a U.S. extrusion machine factory named Leistritz has used a dual screw as shown in FIG. 3-1 to 3-10, in which a hexagonal shaft "Al" is the main member with a given number of other screw elements according to the physical characteristics of a plastic material. The other screw elements include the screw elements A2, A3, A4, A5, A6, A7, A8, A9, A10, A11, A12 and A13 (as shown in FIGS. 3—3 to 3-10), which are to be sleeved around the hexagonal shaft "Al". A screw head A14 is mounted, by means of threads, at one end of the hexagonal shaft Al and fixes the other screw elements in place.

In fact, the single screw rod used in an injection molding machine is completely different from that used in an extrusion machine. An extrusion machine produces products continuously, and its screw rod rotates continuously in one direction. The screw rod of an injection molding machine rotates discontinuously in one direction and has reciprocating actions. So the motions of an injection screw are sophisticated. The fastening strength of the various screw elements by means of the screw head A14 is much lower. Further, the manufacture of the hexagonal shaft and hole therein is also much difficult. When such a structure is used in an injection molding machine for a screw with a small diameter, the smallest root diameter zones A101, A141 and A142 are susceptible to becoming broken as a result of torsional force. When the screw is rotating and metering, the shearing stress caused by the axial force is much less than by the torsional force. We can suppose in this case that the maximums shearing stress is mainly induced by the pure torsional force and it's value can be estimated as 16T/d, (in which "T" stands for torque, while "d" stands for the cylindrical root diameter). The shearing stress and the torque are in direct proportion, and the shearing stress is in inverse proportion to the cubic value of the diameter of the cylindrical root diameter. Under the condition of not exceeding the diameter zone stress of a material, if the root diameter zone A101 is changed to 0.8 of its original diameter, the torque applied to the screw will be 0.512 times (i.e., 0.8 ) of its original torque. The same is true for the root diameter zones A141 and A142 of the screw head A14; therefore, such structure requires further improvement.

SUMMARY OF THE INVENTION

This invention relates to a screw set for an injection molding machine, and particularly to the screw which is divided into three sections, in which the compression and melting section and the metering-and-mixing section each are separate parts from the screw, and each of them can be assembled or disassembled by means of internal splines, a splined shaft, threads and positioning section. Such structure is particularly suitable for a screw set with a smaller diameter. The prime feature of the present invention is to provide a screw rod set which includes several separate screw elements having different functions. In other words, a screw element with various characteristics to meet the requirements of different materials for different products can be formed by changing the number of its elements, the shapes and assembling order of the various elements. The present invention has made a breakthrough out of the conventional three-section type of screw. The screw according to the present invention is not a rod to be made integrally as one piece. And it can solve the inconsistent state between the so-called "universal" and the "individual" screw and can also facilitate the maintenance and replacement thereof.

Another feature of the present invention is to provide a screw set which can reduce the possibility of a torque being applied to the smallest root diameter where it is susceptible to being broken. In other words, the screw set according to the present invention has greatly increased the serviceable life of a screw set.

BRIEF DESCRIPTION OF THE DRAWINGS:

FIGS. 4A and 4B illustrate two plan views of an embodiment according to the present invention, showing the feeding section of the screw thereof.

FIG. 4D through 4F illustrate plan views of an embodiment according to the present invention, showing the compression and melting elements of the screw thereof.

FIG. 4G through 4J illustrate plan views of an embodiment according to the present invention, showing the measuring-and-mixing elements of the screw thereof.

FIGS. 4K and 4L illustrate two plan views of an embodiment according to the present invention, showing the screw heads thereof.

FIG. 7A is a sectional view taken along line C—C in FIG. 4D.

FIG. 7B is a side view of FIG. 4D.

FIG. 8A is a sectional view taken along line D—D in FIG. 4E.

FIG. 8B is a side view of FIG. 4E.

FIG. 9A is a sectional view taken along line E—E in FIG. 4H.

FIG. 9B is a side view of FIG. 4H.

FIG. 10A is a sectional view taken along line F—F in FIG. 4J.

FIG. 10B is a side view of FIG. 4J.

DETAILED DESCRIPTION

Figure 1A:
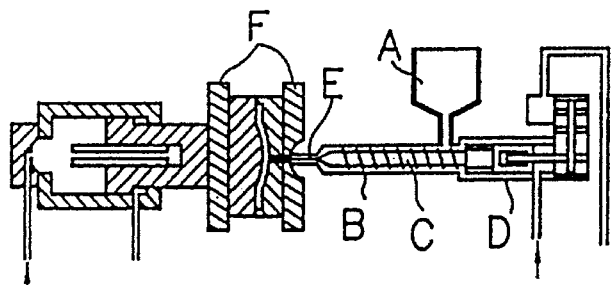
FIG. 1A illustrates a conventional screw type of an injection molding machine, showing the machine under clamping mold condition.
Figure 1B:
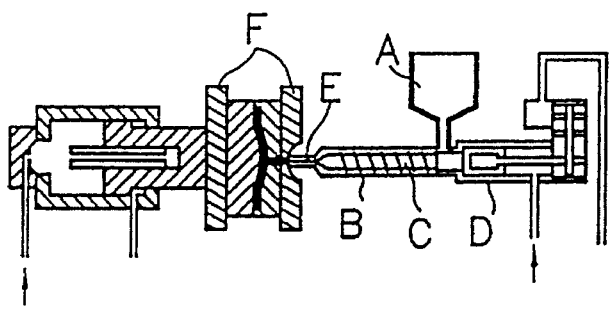
FIG. 1B illustrates a conventional screw type of an injection molding machine, showing the machine under the injection condition.
Figure 1C:
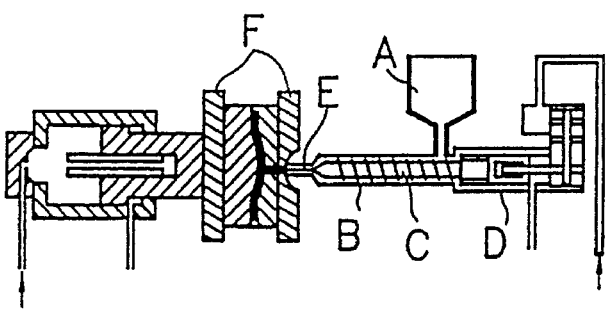
FIG. 1C illustrates a conventional screw type of an injection molding machine, showing the machine under cooling and metering condition.
Figure 1D:
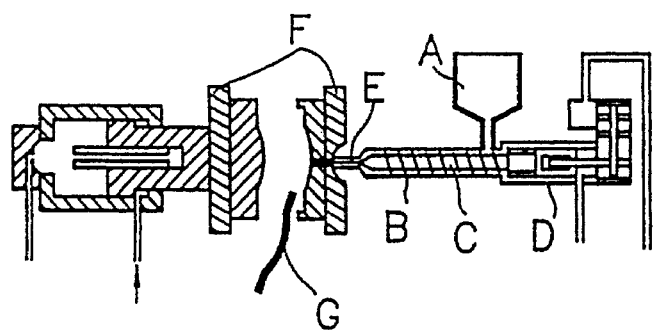
FIG. 1D illustrates a conventional screw type of an injection molding machine, showing the machine under de-molding, condition.
Figure 2:
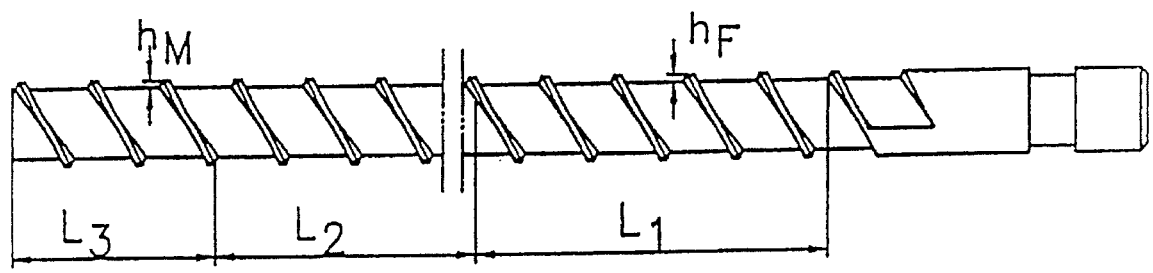
FIG. 2 is a plan view of a conventional injection screw
Figure 3A:
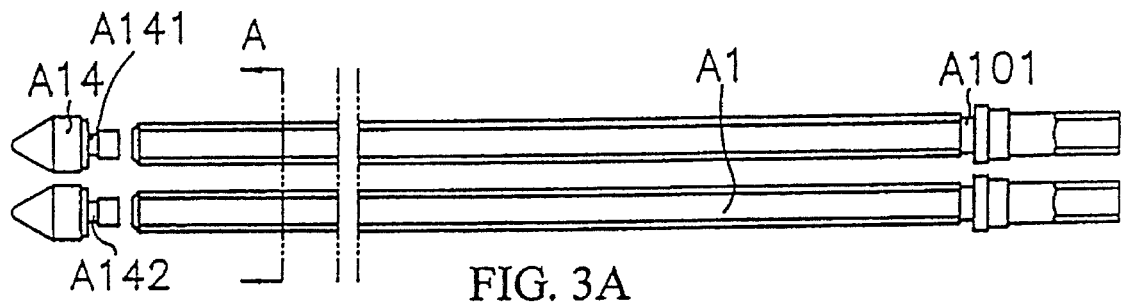
FIG. 3A is a plan view of a dual screw set of a conventional extrusion machine, showing the screw elements each being a hexagonal rod.
Figure 3C:
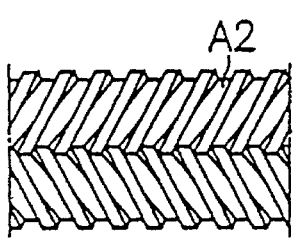
FIGS. 3C through 3J illustrate the plan views of the conventional dual screw elements of extrusion screw sets.
Figure 3D:
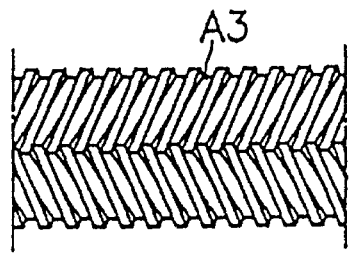
Figure 3E:
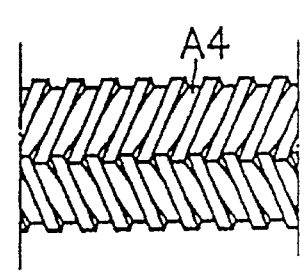
Figure 3F:
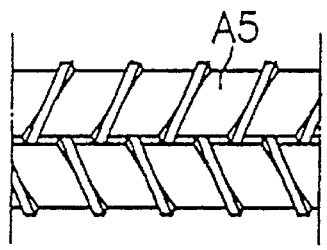
Figure 3G:
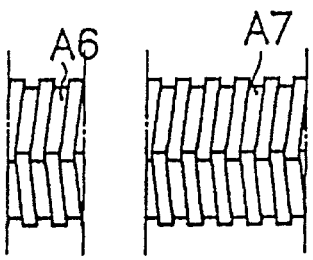
Figure 3H:
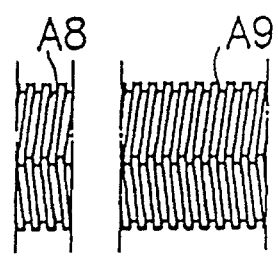
Figure 3I:
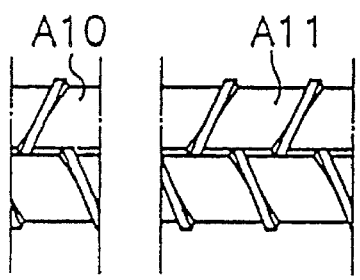
Figure 3J:
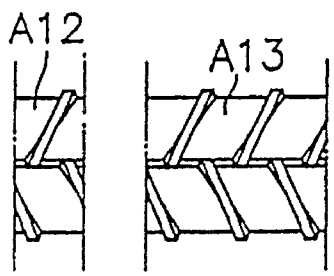
Figure 3B:
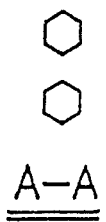
FIG. 3B is a sectional view taken along line A—A in FIG. 3A.

FIGS. 4A through 4L illustrate plan views of an embodiment of a screw set according to the present invention, which comprises feeding sections 11 and 12, compression and melting function elements 13,14,15 and 16, metering-and-mixing function elements 17,18,19 and 20, and screw heads 21 and 22; the embodiment has a total of 12 parts, which can be assembled into 32 different screw sets. The geometrical shape in the feeding section of an injecting screw indicates a single thread type with equal pitch; the main variation of the feeding sections is usually their length; for example, an injecting screw with L/D ratios of 20 has a feeding section about 40–60% of its total length. As shown in FIGS. 4A and 4B, the splined shafts 112 and 122 and the feeding sections 111 and 121 are made into one piece respectively so as to reduce the torque applied on the small position root diameter. The small root diameter starts from the 116 and 126 respectively. In that case, when the section from the small root diameter 116 or 126 to the screw rod head 21 or 22 rotates, such positions 116 or 126 merely bear a torque caused by a friction force between such sections and a plastic material or a heating barrel. Therefore, the torque applied to the small root diameter would be reduced greatly. Such a design will be applied to smaller diameter screws because the structural strength of the screw set is increased. The compression section of the screw is provided with melting elements in different shapes so as to mold different kinds of plastic materials, and to eliminate incomplete plasticizing conditions in the plasticizing process, and to facilitate the molding process to be done at a lower temperature or to increase the plasticizing capacity. FIGS. 4C through 4F illustrate the compression and melting section and include several elements 13,14,15 and 16, in which there are internal splined 131,141 and 151.(as shown in FIGS. 6A, 7A, 8A and 8B). The metering section of a screw has two categories according to the mixing type, (i.e., a dispersion and a distribution mixing screw). In a molding operation, both mixing types are existing simultaneously, but they might have major differences in accordance with the peripheral scope of the screws designed. As shown in FIGS. 4G through 4J, the metering-and-elements section of the screw include elements 17, 18, 19 and 20, in which the element 19 belongs to a distribution type; the element 17 belongs to a dispersion type, while the element 18 and 20 are deemed to provide a type of screw set in between the aforesaid two types. The screw heads 21 and 22 may be classified as check-valve type and non-check-valve type. For instance, the screw head 21 is the check-valve type, which is good for mid or low viscosity plastic material. The check-valve type prevents the melted material from flowing backwards during the injection process, (i.e., to elevate the injection efficiency). The screw head 22 is the non-check-valve type, which is good for thermoses plastic, rubber and high viscosity plastic. The screw head 22 can reduce the stagnant phenomenon of melted plastic and the additional shearing heat.

Figure 5:
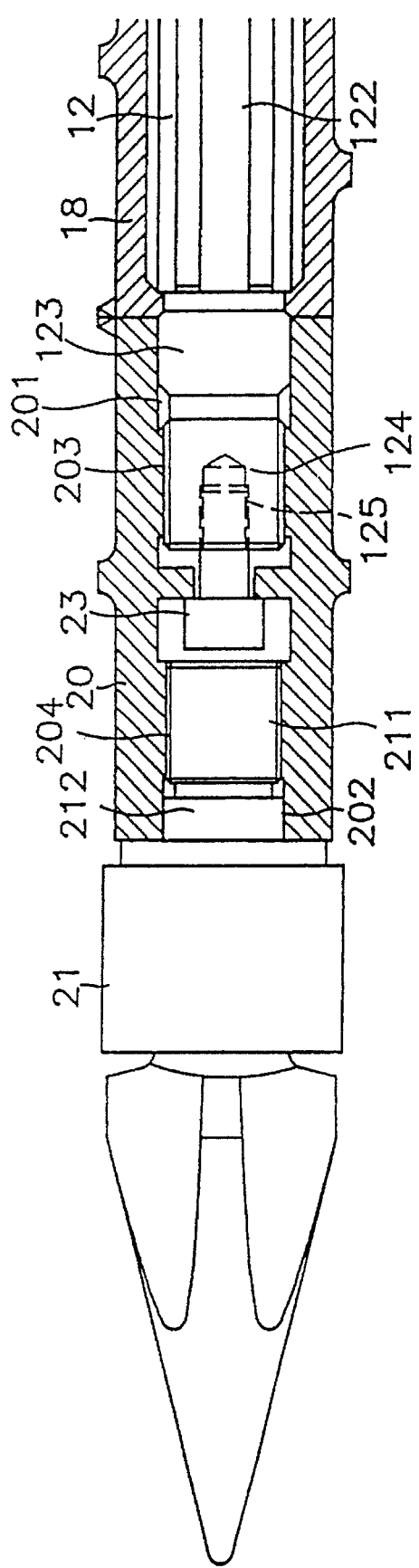
FIG. 5 is a sectional view of an embodiment of screw set according to the present invention.
Figure 6:
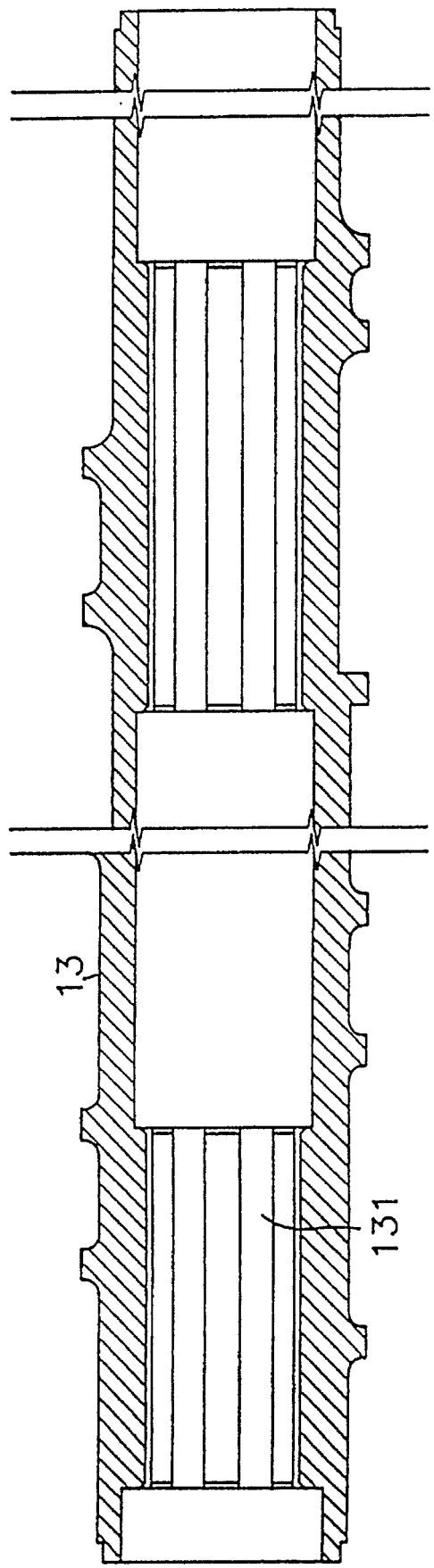
FIG. 6 is a sectional view taken along line B—B in FIG. 4C.

As shown in FIG. 5, the screw set includes several compression and melting elements 13, 14, 15 or 16 and a metering-and-mixing elements 17 or 18 and 19 or 20, which are mounted, in proper sequence, on a splined shaft 122 or 112 of a feeding section 12 or 11. Then, the inner threads 203 (of section 20) engage tightly with a screw stub 124 or 114 of the feeding section 12 or 11. The injection screw not only can rotate, but also can reciprocate. When plastic material with additional fiber is fed in the screw, the front element (such as 20 or 19) might not bear a torque force that is always opposite to the rotation direction. In that case, a screw bolt 23 inside the metering-and-mixing element 20 or 19 is tightly mounted in a screw hole 125 of the feeding section 12 or 11 in order to set against the front screw element 19 or 20 tightly. It is preferred that the screw bolt 23 has right handed threads, while the screw stub 114 or 124 has left handed threads. Finally, the screw head 21 or 22 is tightly set in place, by means of the screw stub 211 or 221, with the inner threads 204 of the front screw element such as 20 or 19) so as to complete a screw set.

Since the geometrical accuracy of the screw is very important, i.e., the a clearance between the outer diameter of the screw and the inner diameter of the barrel must be within about 16T/d (D is the outer diameter of the screw). Besides, the outer diameter of the screw must be controlled exactly, and the accuracy of perpendicularity and straightness between elements is also very important. In view of the rigid requirements as mentioned above, a splined fitting method is used in the present invention. The internal spline is formed integrally with a broach so as to obtain the geometrical accuracy desired. The internal splines in the elements are shown in FIGS. 6A, 7A, 7B, 8A, 8B, 9A, 9B, 10A and 10B. Although the front screw elements, such as the metering-and-mixing elements 19 and 20, are mounted in place by means of threads, their geometrical accuracy can surely be maintained by means of the positioning zones 113, 123, 201, 202 (as shown in FIG. 10B), 212 and 222.

The aforesaid paragraphs have given a description on the embodiment according to the present invention in which the compression section and the metering section may include more than one element. If the feeding section is deemed too short, an independent feeding element may be added to obtain a length desired. Other design parameters, such as the thread type, depth of thread, width of thread, and screw pitch, are omitted because of being well-known technology they are not included within the scope of the present invention. The aforesaid embodiment is deemed merely a method to carry out the present invention. Of course, the number and length of the screw elements therein may be varied in accordance with actual requirements.

What is claimed is:

1. An interchangeable injection screw for use in an injection molding machine comprising:

(a) an interchangeable feeding section, an interchangeable compression-and-melting section, an interchangeable metering-and-mixing section, and an interchangeable screw head, wherein said interchangeable feeding section, said interchangeable compression-and-melting section, said interchangeable metering-and-mixing section and said interchangeable screw head are severable from each other;

(b) a splined shaft integrally formed with said interchangeable feeding section and extending in front thereof so as to sleevedly receive, in order from said feeding section, said compression-and-melting section and said interchangeable metering-and-mixing section; and a screw means for affixing said interchangeable screw head to said splined shaft to thereby form a complete injection screw.

2. An interchangeable injection screw set for use in an injection molding machine as claimed in claim 1, wherein said splined shaft contains a female screw stub at its front to threadably receive a matching male screw bolt internally provided in said interchangeable metering-and-mixing section.

3. An interchangeable injection screw set for use in an injection molding machine as claimed in claim 1, wherein a plurality of each of said interchangeable feeding section, said interchangeable compression-and-melting section, said interchangeable metering-and-mixing section and said interchangeable screw head are provided so as to suit a variety of injection molding conditions.

4. An interchangeable injection screw set for use in an injection molding machine as claimed in claim 3 wherein said plurality of said interchangeable feeding sections, said interchangeable compression-and-melting sections, or said interchangeable metering-and-mixing sections are provided with varying lengths.

* * * * *